M. LEITCH.
MILKING MACHINE.
APPLICATION FILED MAR. 30, 1915.

1,195,998.

Patented Aug. 29, 1916.

WITNESSES:

INVENTOR
Meredith Leitch
BY Frank S. Busser
Atty.

UNITED STATES PATENT OFFICE.

MEREDITH LEITCH, OF POUGHKEEPSIE, NEW YORK, ASSIGNOR TO THE DE LAVAL SEPARATOR COMPANY, A CORPORATION OF NEW JERSEY.

MILKING-MACHINE.

1,195,998.  Specification of Letters Patent.  Patented Aug. 29, 1916.

Application filed March 30, 1915. Serial No. 17,976.

*To all whom it may concern:*

Be it known that I, MEREDITH LEITCH, a citizen of the United States, residing at Poughkeepsie, county of Dutchess, and State of New York, have invented a new and useful Improvement in Milking-Machines, of which the following is a full, clear, and exact description, reference being had to the accompanying drawings, which form a part of this specification.

In certain applications filed by me February 16, 1915, Serial No. 8456, Serial No. 8457 and Serial No. 8458, I have set forth various constructions invloving the employment of double chambered teat cups combined with a single pulsation pipe line adapted to maintain a continuous exhaust in the milk pail and in the milk discharge thereto from the inner teat cup chambers, to connect directly with the outer teat cup chambers to produce pulsations therein, and to operate a valve to intermittently admit, from a source other than the outer teat cup chambers, fresh air into the milk discharge to produce pulsations therein; preferably in such manner that the squeezing pressure is applied to the teat coincidently with the application of maximum suction thereto, which squeezing pressure is released coincidently with the reduction of suction thereon.

The object of the present invention is to provide an alternative means of effecting the results accomplished in said applications, said means involving a different means of establishing a continuous suction in the milk discharge, a different construction of valve, the employment of a valve which performs the double function of separating the milk discharge from the pulsation line leading to the outer teat cup chambers and of intermittently admitting air to the milk discharge, and certain novel details of construction involving a simplification of the apparatus.

Figure 1:
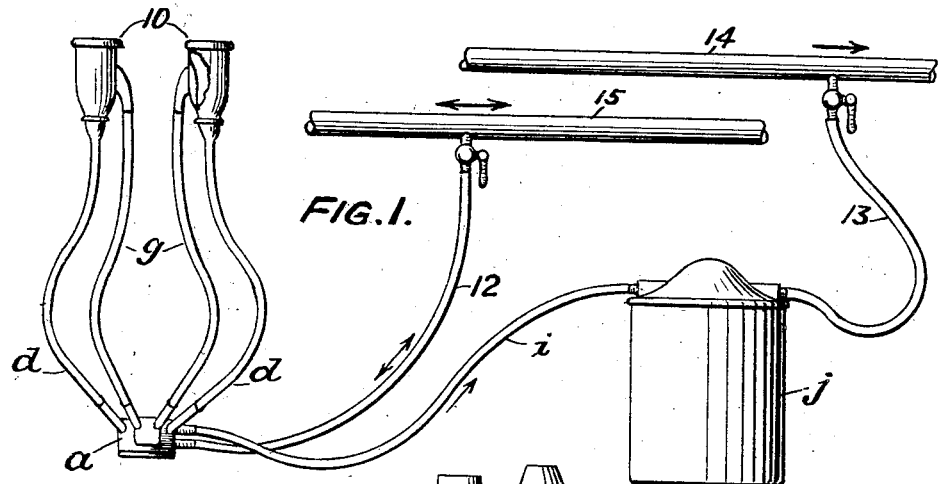
Figure 2:
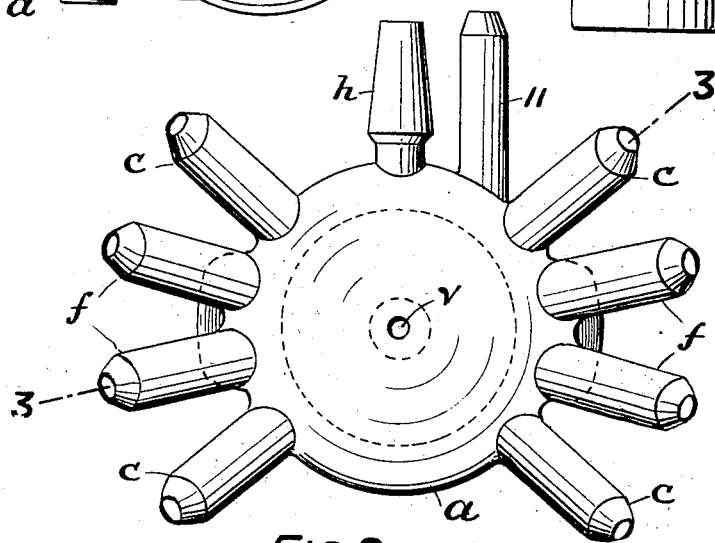
Figure 3:
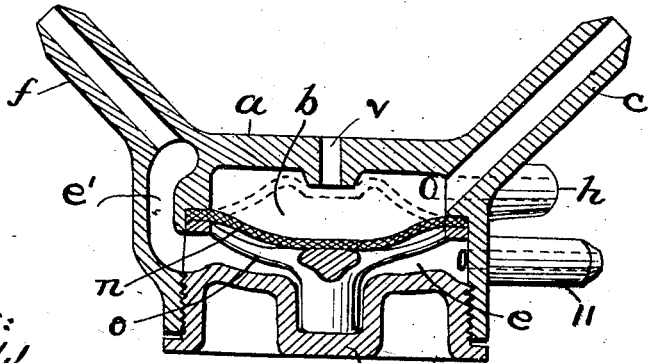

In the drawings, which show a preferred embodiment of my invention—Figure 1 is a diagrammatic view of a complete unit. Fig. 2 is a plan view of the claw. Fig. 3 is a section through the claw on the line 3—3 of Fig. 2.

The claw body $a$ has a central chamber $b$ from which project four tubes $c$, adapted to connect to flexible extensions $d$ from the inner or teat receiving chambers of the teat cups 10, and one tube $h$ adapted to be connected by a flexible tube $i$ with a milk pail $j$ which, in turn, is connected by a flexible tube 13 with a source of continuous suction, as a pipe line 14 which has a valve and branch at each stanchion. Adjacent to the chamber $b$ and separated from it by a flexible diaphragm $n$ is a chamber $e$ from which project four tubes $f$, adapted to be connected by flexible tubes $g$ with the outer chambers of the teat cups 10, and one tube 11 adapted to be connected by a flexible tube 12 with a pipe line 15, which has a valve and branch convenient to each stanchion and in which the pressure pulsates from a value not more than that in the pipe line 14 to a value approximately equal to atmospheric pressure.

The lower side of the chamber $e$ is formed by a plug $k$ which screws into the claw body $a$ and by a spider $o$ holds the diaphragm $n$ against its seat.

At $v$ is an air port which is open when the diaphragm $n$ is in the position shown in solid lines in Fig. 3 but closed when the diaphragm is in the position shown in broken lines.

When ready to milk, the operator connects each of the pipes 12 and 13 with the branch from its pipe line and opens the valves. The air is immediately exhausted through the pipe 13 from the milk pail $j$ and through the pipe $i$ is drawn from the chamber $b$ the tubes $c$ and $d$ and the inner chambers of the teat cups 10.

When a high pressure wave comes from the pipe line 15 through the pipe 12 into the chamber $e$ the diaphragm $n$ is forced to the position shown in broken lines. The port $v$ is then closed and the vacuum in the chamber $b$ and also in the teat cups 10 approaches that in the milk pail $j$. Coincidently the pressure wave passes through the tubes $f$ and $g$ into the outer teat cup chambers and because the inner chambers are under suction causes them to collapse, compress the teats and force the milk out.

When the low pressure wave comes from the pipe line 15 the suction on opposite sides of diaphragm $n$ is balanced, and atmospheric pressure acting upon the center of the diaphragm draws it down to the position shown in solid lines in Fig. 3, and air enters through the port $v$ and reduces the vacuum in the chamber $b$, the tubes $c$ and $d$ and the inner chambers of the teat cups 10. Coincidently the air is exhausted from the tubes *f* and *g* and the outer chambers of the teat cups 10, causing the inner chamber to expand and allow the teat to be drawn down into the cup and to fill with milk. With the next high pressure wave the cycle is repeated.

It may be easily seen that the teats are subjected to a strong suction and coincidently to a compression, and alternately therewith to a lesser suction and a release of the compression, and that with a heavy flow of milk obstructing the pipe *i* the reduction of suction by air entering through the port *v* will be great, while with little or no milk flowing the air will be quickly carried off through the pipe *i* and the reduction of suction will be less. Therefore, this device subjects the teats to intermittent compression and coincidently to a pulsating suction in which the average intensity varies inversely and the amplitude of pulsation varies directly as the flow of milk; the mode of operation, in this respect, being the same as in the Hulbert Patents No. 1,043,013 and No. 1,070,134.

While I have shown an air port that is open to continuous inflow of air during a portion of the cycle of operation, the invention is not limited to that arrangement, and does not exclude the employment of an air reservoir opening alternately to the atmosphere and to the milk chamber, as shown in my co-pending applications, filed February 16, 1915, Serial No. 8456, 8457 and 8458. Nor is my invention limited, except in those claims wherein it is specifically set forth, to a flexible diaphragm, nor to a flexible diaphragm performing the double function of an air admission valve and a partition separating the milk chamber from the pulsation chamber. Nor is my invention limited, except when specifically claimed as an element of the combination, to the employment of a pulsating line and a separate and independent vacuum line, this feature, in and of itself, not being novel, but possessing certain advantages in a combination wherein the pulsations in the outer chambers of the teat cups are effected by being in direct and open communication with the pulsating line, and wherein such pulsations control means for intermittently admitting air to the milk discharge.

Having now fully described my invention, what I claim and desire to protect by Letters Patent is:

1. In a milking machine, in combination, a milk pail, a double chambered teat cup, a milk discharge in constant communication with the inner teat cup chamber and with the milk pail, a vacuum line in constant communication with the milk pail whereby the latter and the milk discharge may be placed under continuous suction, a pneumatic pulsation line independent of the vacuum line in constant communication with the outer teat cup chamber, and a valve connected with, and whose operation is controlled by the pulsation in, the pulsation line, said valve operating to intermittently admit pressure fluid to the milk discharge.

2. In a milking machine, in combination, a double chambered teat cup, a milk pail, a constantly open milk discharge between the inner teat cup chamber and the milk pail, a pneumatic pulsation line in constant communication with the outer teat cup chamber, an independent vacuum line connected with the milk pail to produce a continuous partial vacuum therein, and a valve adapted to intermittently admit pressure fluid to the milk discharge, said valve having a pressure face subject to the pulsations in the pulsation line whereby its operation is controlled.

3. In a milking machine, in combination, a double chambered teat cup, a claw having a pulsation chamber communicating with the outer teat cup chamber and a milk chamber communicating with the inner teat cup chamber, a diaphragm separating the two chambers, a pneumatic pulsation line in communication with said pulsation chamber, a separate vacuum line establishing continuous suction in said milk chamber, said diaphragm being movable under the influence of said pneumatic pulsations and adapted in its movement to control the intermittent admission of pressure fluid to said milk chamber.

4. In a milking machine, in combination, a double chambered teat cup, a claw having a pulsation chamber communicating with the outer teat cup chamber and a milk chamber communicating with the inner teat cup chamber, a diaphragm separating the two chambers, a pneumatic pulsation line in communication with said pulsation chamber, a separate vacuum line establishing continuous suction in said milk chamber, said diaphragm being movable under the influence of said pneumatic pulsations, there being an air inlet to said milk chamber, said diaphragm in its movement acting as a valve to alternately open and close said inlet.

5. In a milking machine, in combination, a double chambered teat cup, a claw having a pulsation chamber communicating with the outer teat cup chamber and a milk chamber communicating with the inner teat cup chamber and with a source of continuous suction, a diaphragm separating the two chambers, and means to establish pneumatic pulsations in said pulsation chamber thereby operating the diaphragm, said diaphragm adapted in its movement to control the intermittent admission of pressure fluid to said milk chamber.

6. In a milking machine, in combination, a double chambered teat cup, a claw having a pulsation chamber communicating with the outer teat cup chamber and a milk chamber communicating with the inner teat cup chamber and with a source of continuous suction, a diaphragm separating the two chambers, and means to establish pneumatic pulsations in said pulsation chamber thereby operating the diaphragm, there being an air inlet to said milk chamber, said diaphragm in its movement acting as a valve to alternately open and close said inlet.

7. In a milking machine, in combination, a double chambered teat cup, a claw, a member in the claw serving as a partition to divide the claw into two separate and independent chambers and as a valve to intermittently admit pressure fluid to one chamber, one of said claw chambers communicating with the inner teat cup chamber and the other claw chamber communicating with the outer teat cup chamber, means to operate said member and to create continuous suction in the claw chamber connected with the inner teat cup chamber.

8. In a milking machine, in combination, a double chambered teat cup, a claw, a member in the claw serving as a partition to divide the claw into two separate and independent chambers and as a valve to intermittently admit pressure fluid to one chamber, the last named claw chamber communicating with the inner teat cup chamber and the other claw chamber communicating with the outer teat cup chamber, and means to create continuous suction in the claw chamber communicating with the inner teat cup chamber and to produce pneumatic pulsations in the other claw chamber whereby said member is operated.

In testimony of which invention, I have hereunto set my hand, at Poughkeepsie, N. Y., on this 26th day of March, 1915.

MEREDITH LEITCH.

Witnesses:
GRACE MCCANN,
CHARLES L. POWELL.